(12) United States Patent
Walker et al.

(10) Patent No.: US 12,157,986 B2
(45) Date of Patent: Dec. 3, 2024

(54) APPARATUS AND METHOD FOR INSERTING AN ELONGATE OBJECT INTO A TRENCH

(71) Applicant: Soil Machine Dynamics Limited, Wallsend (GB)

(72) Inventors: John Graeme Walker, Wallsend (GB); Roger Paul White, Wallsend (GB)

(73) Assignee: Soil Machine Dynamics Limited, Wallsend (GB)

( * ) Notice: Subject to any disclaimer, the term of this patent is extended or adjusted under 35 U.S.C. 154(b) by 0 days.

(21) Appl. No.: 17/205,931

(22) Filed: Mar. 18, 2021

(65) Prior Publication Data
US 2021/0292995 A1    Sep. 23, 2021

(30) Foreign Application Priority Data
Mar. 20, 2020 (EP) .................................. 20164557

(51) Int. Cl.
*E02F 5/08* (2006.01)
*E02F 5/10* (2006.01)

(52) U.S. Cl.
CPC .............. *E02F 5/106* (2013.01); *E02F 5/109* (2013.01)

(58) Field of Classification Search
CPC ... E02F 5/106; E02F 5/109; E02F 5/08; E02F 5/104; E02F 3/90; E02F 3/905; E02F 5/125; E02F 3/902; E02F 3/925; E02F 5/027; E02F 5/101; E02F 5/103; E02F 5/107; E02F 5/145; E02F 3/04; E02F 3/885; E02F 3/8866; E02F 3/8875; E02F 3/907; E02F 3/9243; E02F 5/006; E02F 5/105; E02F 5/108; E02F 7/005; E02F 7/06; E02F 7/10; E02F 9/065; E02F 9/2004; E02F 3/301;
(Continued)

(56) References Cited

U.S. PATENT DOCUMENTS 1,427,699 A * 8/1922 Richter .................. B25B 27/00
254/29 R
1,877,974 A * 9/1932 Robb ...................... F16L 1/038
414/745.6
(Continued)

FOREIGN PATENT DOCUMENTS

CN    105202263 A    12/2015
DE    19542689 C1    4/1997
(Continued)

OTHER PUBLICATIONS

European Patent Office, Extended Search Report, Application No. 19213813.9, May 18, 2020, 9 pages.
(Continued)

*Primary Examiner* — Edwin J Toledo-Duran
(74) *Attorney, Agent, or Firm* — Reinhart Boerner Van Deuren s.c.

(57) ABSTRACT

A wheel cutter tractor for inserting a cable into a trench is disclosed. The tractor comprises a wheel cutter for cutting a trench, and tracks for moving the tractor relative to the trench. A cable support tray supports the cable in a first position displaced from the wheel cutter in a direction transverse to a direction of travel of the tractor, and in a second position above the wheel cutter. A cable grab and lifting device transfers the cable into the cable support tray.

24 Claims, 9 Drawing Sheets

(58) Field of Classification Search
CPC ..... E02F 3/8808; E02F 3/8825; E02F 3/8833;
E02F 3/8841; E02F 3/9218; E02F 3/9262;
E02F 3/9268; E02F 3/9275; E02F 3/9293;
E02F 3/94; E02F 3/961; E02F 3/962;
E02F 5/04; E02F 5/06; E02F 5/10; E02F
5/102; E02F 5/14; E02F 5/28; E02F
7/065; E02F 9/024; E02F 9/026; E02F
9/028; E02F 9/2045; E02F 9/262; E02F
9/2858; H02G 1/06; H02G 1/10; H02G
9/02; H02G 9/12; H02G 3/0475; F16L
1/235; F16L 1/207; F16L 1/19; F16L
1/20; F16L 1/23; F16L 1/12; F16L 1/16;
F16L 1/205; F16L 1/18; F16L 1/203;
F16L 1/123; F16L 1/225; F16L 1/202;
F16L 1/26; F16L 1/166; F16L 1/161;
F16L 1/165; F16L 1/24; F16L 1/15; F16L
3/237; F16L 1/14; F16L 1/206; F16L
3/02; F16L 3/20; F16L 55/02; F16L
55/132; F16L 55/136; F16L 57/02; F16L
59/143; F16L 13/0272; F16L 1/00; F16L
3/00; F16L 3/1218; F16L 3/222; F16L
3/2431; F16L 51/04; F16L 55/1283; F16L
57/00; F16L 57/06; F16L 58/00; F16L
58/02; F16L 58/181; F16L 59/065; F16L
59/12; F16L 59/20; F16L 7/00; F16L
9/00; F16L 9/047; F16L 9/18; F16L 9/19;
F16L 9/22; E02B 2017/0091; E02B
2017/0095; E02B 17/00; E02B 17/0004;
E02B 17/02; E02B 17/025; E02B 17/027;
E02B 2017/0065; E02B 3/24; E02B 8/00
See application file for complete search history.

(56) References Cited

U.S. PATENT DOCUMENTS

| | | | | |
|---|---|---|---|---|
| 1,910,022 | A * | 5/1933 | Legg | H01R 4/643 |
| | | | | 439/433 |
| 2,048,710 | A | 7/1936 | Ranney | |
| 2,136,911 | A | 11/1938 | Briscoe | |
| RE20,990 | E | 1/1939 | Wright | |
| 2,849,809 | A | 9/1958 | Chattin | |
| 3,068,036 | A * | 12/1962 | Doty | B66C 1/422 |
| | | | | 294/104 |
| 3,238,734 | A | 3/1966 | Rhodes | |
| 3,333,432 | A | 8/1967 | Hale et al. | |
| 3,434,297 | A * | 3/1969 | Spollen | E02F 5/105 |
| | | | | 405/160 |
| 3,462,963 | A | 8/1969 | Moore | |
| 3,486,215 | A * | 12/1969 | Gray | F16L 1/09 |
| | | | | 29/237 |
| 3,504,504 | A * | 4/1970 | Elliott | E02F 5/106 |
| | | | | 405/163 |
| 3,526,047 | A | 9/1970 | Roessler et al. | |
| 3,590,589 | A | 7/1971 | Smulders | |
| 3,627,372 | A | 12/1971 | Carpenter et al. | |
| 3,653,115 | A * | 4/1972 | Perkins | F16L 1/09 |
| | | | | 29/237 |
| 3,670,514 | A * | 6/1972 | Breston | E02F 5/109 |
| | | | | 405/160 |
| 3,722,224 | A | 3/1973 | Roy | |
| 3,751,927 | A | 8/1973 | Perot, Jr. | |
| 3,877,237 | A | 4/1975 | Norman | |
| 3,897,639 | A | 8/1975 | Hansen | |
| 3,990,377 | A | 11/1976 | Marquinez | |
| 4,022,028 | A | 5/1977 | Martin | |
| 4,037,422 | A * | 7/1977 | DeBoer | E02F 5/107 |
| | | | | 405/160 |
| 4,039,087 | A * | 8/1977 | Sandvick, Sr. | F16L 1/09 |
| | | | | 29/237 |
| 4,091,629 | A | 5/1978 | Gunn et al. | |
| 4,124,991 | A | 11/1978 | Adler | |
| 4,129,992 | A | 12/1978 | Carlsson et al. | |
| 4,149,326 | A * | 4/1979 | Rosa | E02F 5/108 |
| | | | | 405/160 |
| 4,218,158 | A * | 8/1980 | Tesson | F16L 1/26 |
| | | | | 405/158 |
| 4,268,189 | A * | 5/1981 | Good | F16L 1/06 |
| | | | | 405/172 |
| 4,268,190 | A * | 5/1981 | Tesson | F16L 1/26 |
| | | | | 405/184.5 |
| 4,274,760 | A * | 6/1981 | Norman | E02F 5/105 |
| | | | | 405/160 |
| 4,295,757 | A * | 10/1981 | Gaspar | E02F 5/107 |
| | | | | 405/164 |
| 4,301,606 | A | 11/1981 | Hofmeester | |
| 4,362,436 | A * | 12/1982 | Harmstorf | E02F 5/109 |
| | | | | 405/164 |
| 4,410,297 | A | 10/1983 | Lynch | |
| 4,465,400 | A * | 8/1984 | Adams | F16L 1/161 |
| | | | | 405/169 |
| 4,470,720 | A * | 9/1984 | Lennard | E02F 5/108 |
| | | | | 405/164 |
| 4,542,940 | A * | 9/1985 | Marten | E02F 3/303 |
| | | | | 173/8 |
| 4,585,372 | A | 4/1986 | Grinstead et al. | |
| 4,586,850 | A | 5/1986 | Norman et al. | |
| 4,714,378 | A * | 12/1987 | Lincoln | E02F 5/104 |
| | | | | 405/161 |
| 4,714,379 | A | 12/1987 | Gilchrist, Jr. | |
| 4,721,409 | A | 1/1988 | Harmstorf | |
| 4,749,308 | A * | 6/1988 | Izawa | E02F 3/8858 |
| | | | | 405/161 |
| 4,790,057 | A * | 12/1988 | Baker | F16L 1/06 |
| | | | | 29/237 |
| 4,802,793 | A | 2/1989 | Grinsted et al. | |
| 4,812,079 | A | 3/1989 | Johnson et al. | |
| 4,877,355 | A * | 10/1989 | Van Pelt | E02F 5/107 |
| | | | | 405/158 |
| 4,896,998 | A * | 1/1990 | Reece | F16L 1/12 |
| | | | | 405/160 |
| 4,992,000 | A * | 2/1991 | Doleshal | E02F 5/108 |
| | | | | 405/164 |
| 5,219,265 | A * | 6/1993 | Recker | E02F 3/963 |
| | | | | 414/731 |
| 5,349,765 | A | 9/1994 | Kitanaka et al. | |
| 5,626,438 | A | 5/1997 | Etheridge | |
| 5,659,983 | A | 8/1997 | Coutarel et al. | |
| 5,722,793 | A * | 3/1998 | Peterson | B63B 35/06 |
| | | | | 405/164 |
| 5,795,101 | A * | 8/1998 | Bill | F16L 1/06 |
| | | | | 405/184.5 |
| 5,865,492 | A * | 2/1999 | Horton | E02F 3/3677 |
| | | | | 294/197 |
| 5,918,923 | A * | 7/1999 | Killion | B66C 1/427 |
| | | | | 294/902 |
| 6,189,244 | B1 | 2/2001 | Johnson et al. | |
| 6,193,440 | B1 * | 2/2001 | Pidgeon | E02F 5/14 |
| | | | | 37/106 |
| 6,273,642 | B1 * | 8/2001 | Anderson | E02F 5/105 |
| | | | | 405/163 |
| 6,705,029 | B2 * | 3/2004 | Anderson | E02F 5/14 |
| | | | | 405/160 |
| 6,719,494 | B1 | 4/2004 | Machin | |
| 6,837,653 | B1 * | 1/2005 | Grinsted | E02F 5/145 |
| | | | | 405/164 |
| 7,713,001 | B1 * | 5/2010 | Harlow | E02F 5/102 |
| | | | | 171/45 |
| 8,939,678 | B2 * | 1/2015 | Lazzarin | E02F 5/04 |
| | | | | 405/163 |
| 9,605,407 | B2 | 3/2017 | Penner | |
| 9,702,207 | B2 * | 7/2017 | Randall, Jr. | E21B 19/16 |
| 10,323,383 | B2 | 6/2019 | Wilson | |
| 10,344,892 | B2 * | 7/2019 | Lavalley | B23K 37/0288 |
| 10,711,432 | B2 | 7/2020 | White et al. | |
| 10,947,695 | B2 | 3/2021 | Lu et al. | |
| 11,466,425 | B2 | 10/2022 | Alumbaugh | |

(56) References Cited

U.S. PATENT DOCUMENTS

| | | | |
|---|---|---|---|
| 11,613,870 B2 | 3/2023 | Walker et al. | |
| 2002/0017041 A1 | 2/2002 | Gloppen et al. | |
| 2003/0201011 A1* | 10/2003 | Beals | F16K 7/06 137/15.08 |
| 2007/0253780 A1* | 11/2007 | Pihl | E02F 5/109 405/184 |
| 2010/0086361 A1* | 4/2010 | Harrison | B66C 1/42 405/184 |
| 2010/0092245 A1* | 4/2010 | Fitzsimons | E02F 5/10 405/184 |
| 2010/0095560 A1* | 4/2010 | Grinsted | E02F 5/104 37/352 |
| 2010/0180475 A1* | 7/2010 | Ellett | F16L 1/036 37/406 |
| 2010/0313625 A1* | 12/2010 | Green | F16L 55/17 72/409.19 |
| 2011/0211913 A1 | 9/2011 | Lazzarin et al. | |
| 2012/0114420 A1* | 5/2012 | Lazzarin | F16L 1/163 405/171 |
| 2013/0115006 A1* | 5/2013 | Oldervoll | E02F 5/109 405/160 |
| 2014/0150303 A1 | 6/2014 | Wilson | |
| 2014/0154014 A1 | 6/2014 | Wilson | |
| 2014/0259597 A1* | 9/2014 | Lavalley | B23K 37/0217 72/46 |
| 2014/0283421 A1 | 9/2014 | Manchester | |
| 2014/0345171 A1 | 11/2014 | Manchester | |
| 2015/0110563 A1* | 4/2015 | Manchester | B66C 3/20 405/184.4 |
| 2016/0215476 A1 | 7/2016 | Walker | |
| 2017/0218709 A1* | 8/2017 | Patel | E21B 19/16 |
| 2018/0216314 A1 | 8/2018 | Bonel et al. | |
| 2018/0274710 A1* | 9/2018 | Strother | F16L 55/1683 |
| 2020/0165796 A1 | 5/2020 | Manchester | |
| 2020/0318314 A1 | 10/2020 | Lu et al. | |
| 2021/0010230 A1 | 1/2021 | Hladdorp et al. | |
| 2021/0324612 A1* | 10/2021 | Graham | F16L 1/036 |
| 2022/0099232 A1* | 3/2022 | Chen | B25J 9/102 |
| 2022/0341509 A1* | 10/2022 | Trahan | E02F 3/961 |
| 2022/0352699 A1 | 11/2022 | Walker et al. | |
| 2022/0412046 A1 | 12/2022 | White | |

FOREIGN PATENT DOCUMENTS

| | | | | |
|---|---|---|---|---|
| EP | 0296783 | A1 | 12/1988 | |
| EP | 0543467 | A1 | 5/1993 | |
| EP | 2787126 | A1 | 10/2014 | |
| EP | 2840187 | A1 | 2/2015 | |
| EP | 3121917 | A1 | 1/2017 | |
| EP | 3499662 | A1 | 6/2019 | |
| EP | 4047141 | A1 | 8/2022 | |
| GB | 2049094 | A | 12/1980 | |
| GB | 2172032 | A | 9/1986 | |
| GB | 2212536 | A | 7/1989 | |
| GB | 2355276 | A | 4/2001 | |
| GB | 2545925 | A | 7/2017 | |
| JP | 2015077008 | A | 4/2015 | |
| KR | 20120065024 | A | 6/2012 | |
| NL | 2024240 | B1 * | 7/2021 | E02F 5/106 |
| RU | 2010139625 | A | 4/2012 | |
| WO | 9954556 | A1 | 10/1999 | |
| WO | 0149947 | A1 | 7/2001 | |
| WO | 0175236 | A1 | 10/2001 | |
| WO | 2009141409 | A2 | 11/2009 | |
| WO | 2012007790 | A1 | 1/2012 | |
| WO | 2013167910 | A1 | 11/2013 | |
| WO | 2014161984 | A1 | 10/2014 | |
| WO | 2015032730 | A1 | 3/2015 | |
| WO | 2017017599 | A1 | 2/2017 | |
| WO | WO-2021094193 | A1 * | 5/2021 | E02F 5/106 |

OTHER PUBLICATIONS

European Patent Office, Extended Search Report, Application No. 20164557.9, Nov. 19, 2020, 12 pages.

Danish Patent and Trademark Office, Search Report and Opinion, Application No. PA201870577, Jul. 12, 2019, 9 pages.

PCT International Search Report and Written Opinion, PCT/EP2017/054300, May 11, 2017, 12 pages.

PCT International Search Report and Written Opinion, PCT/EP2020/075803, Feb. 23, 2021, 14 pages.

European Patent Office, Extended Search Report, Application No. 21182054.3, Dec. 22, 2021, 7 pages.

European Patent Office, Extended Search Report, Application No. 22181186.2, Feb. 27, 2023, 12 pages.

European Patent Office, Partial Search Report, Application No. 22181186.2, Nov. 21, 2022, 13 pages.

European Patent Office, Third Party Observations, dated Jun. 18, 2024, 8 pages.

"Development of Submarine Cable Plough Plough Burial of Fibre Optic Submarine Cables," Jönsson et al., Teleteknik 1986, vol. 1, English Edition.

* cited by examiner

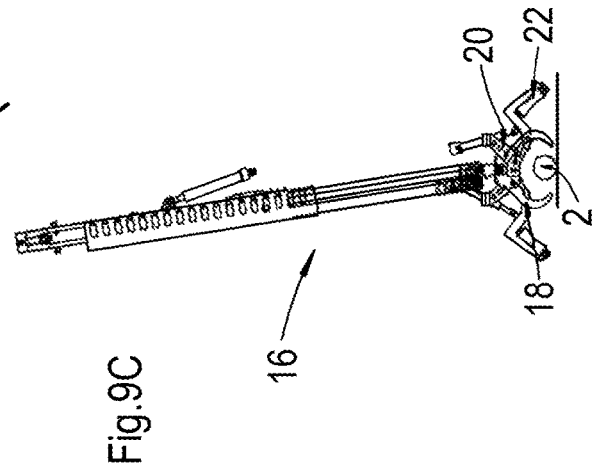
Fig.9B  Fig.9C
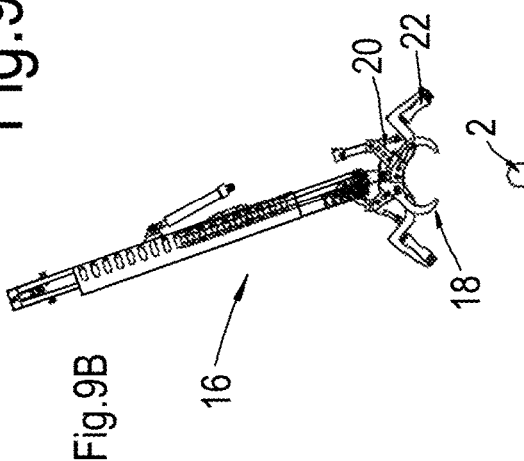
Fig.9A
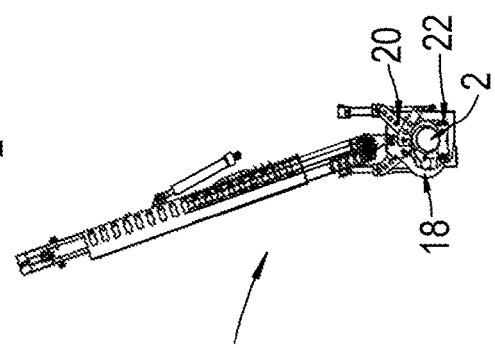
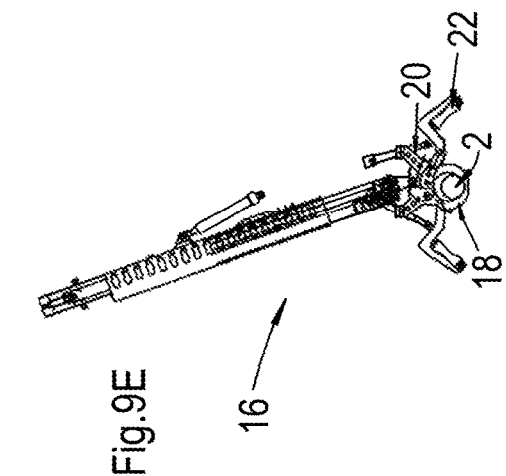
Fig.9E  Fig.9F
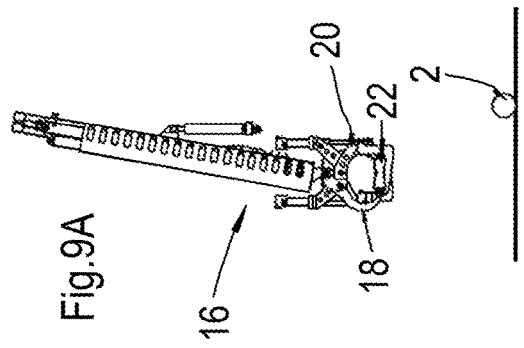
Fig.9D
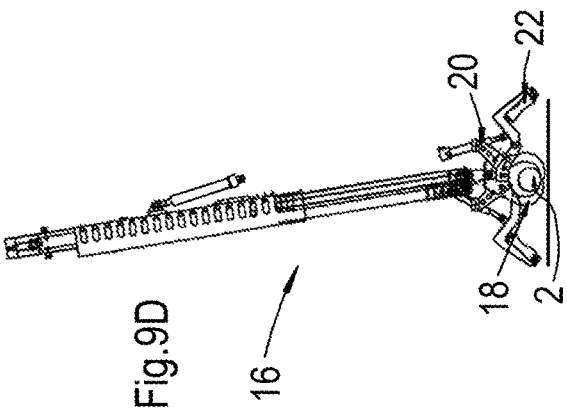

APPARATUS AND METHOD FOR INSERTING AN ELONGATE OBJECT INTO A TRENCH

CROSS-REFERENCE TO RELATED APPLICATIONS

This application claims priority to European Patent Application No. 20164557.9 filed Mar. 20, 2020, the disclosure of which is incorporated herein by reference in its entirety and for all purposes.

STATEMENT CONCERNING FEDERALLY SPONSORED RESEARCH OR DEVELOPMENT

Not applicable.

FIELD OF THE INVENTION

The present disclosure relates to an apparatus and method for inserting an elongate object into a trench, and relates particularly, but not exclusively, to an apparatus and method for inserting a cable into a trench into the seabed.

BACKGROUND OF THE INVENTION

Apparatus are known in which a trench cutting device cuts a trench in the seabed, and the cable to be inserted into the trench is supported above the trench cutting device. In order to locate the cable in position above the trench cutting device, the apparatus is provided with a grab which lifts the cable from the seabed and locates it above the trench cutting device. In the initial stages of operation, i.e. before the trench cutting device has cut the trench, the vertical separation between the initial and final positions of the cable is at its largest, and significant forces need to be applied to the cable to lift it to its final position above the trench cutting device, as a result of which there is a risk of damage to the cable.

SUMMARY OF THE INVENTION

Preferred embodiments seek to overcome one or more of the above disadvantages.

According to an aspect of the disclosure, there is provided an apparatus for inserting an elongate object into a trench, the apparatus comprising:—
trench cutting means for cutting a trench;
moving means for moving the trench cutting means relative to the trench;
support means for supporting at least part of an elongate object in at least one first position displaced from the trench cutting means in a direction transverse to a direction of travel of the apparatus, and in at least one second position above the trench cutting means; and
transfer means for transferring at least part of the elongate object into the support means.

By providing support means for supporting at least part of an elongate object in at least one first position displaced from the trench cutting means in a direction transverse to a direction of travel of the apparatus, and in at least one second position above the trench cutting means, and transfer means for transferring at least part of the elongate object into the support means, this provides the advantage of avoiding the need to lift the elongate object to the second position above the trench cutting means before the trench cutting means has reached its full cutting depth, as a result of which less stress is applied to the elongate object, thereby providing the advantage of reducing the risk of damage to the elongate object. The advantage is further provided that the elongate object can be retained in the first position, instead of the second position, as the apparatus moves forwards to extend the trench, thereby enable further reductions in stress applied to the elongate object. The advantage is also provided of protecting the elongate object from the trench cutting means.

The transfer means may be adapted to transfer at least part of the elongate object into at least one said first position of the support means.

The transfer means may be adapted to lift at least part of the elongate object into at least one said first position of the support means.

This provides the advantage of enabling the elongate object to be easily detached from the apparatus by allowing it to fall from the support means.

The apparatus may further comprise retaining means for retaining at least part of the elongate object in the support means.

The retaining means may be pivotable between a retaining position and a releasing position.

This provides the advantage of facilitating detachment of the elongate object from the apparatus when the elongate object is detached from the apparatus by falling from the support means.

The apparatus may be adapted to insert at least part of the elongate object into the trench from a said first position.

This provides the advantage of avoiding the necessity of lifting the elongate object to the second position while the apparatus moved forwards to extend the trench, thereby further reducing the stress which needs to be applied to the elongate object.

The apparatus may further comprise bend limiting means for preventing bending of the elongate object around a bend of less than a predetermined bend radius.

The transfer means may be moveable between a working position and a stowed position.

The support means may be moveable between at least one said first position and at least one said second position.

The apparatus may further comprise urging means for urging the elongate object into the trench behind the apparatus in a direction of travel of the apparatus.

According to another aspect of the disclosure, there is provided a method of operating an apparatus for inserting an elongate object into a trench, the method comprising:—
cutting a trench using trench cutting means;
moving the trench cutting means relative to the trench;
supporting at least part of an elongate object in at least one first position displaced from the trench cutting means in a direction transverse to a direction of travel of the apparatus during cutting of the trench.

The method may further comprise transferring at least part of the elongate object to at least one second position above the trench cutting means.

The method may further comprise urging the elongate object into the trench behind the apparatus in a direction of travel of the apparatus.

According to a further aspect of the disclosure, there is provided an apparatus for inserting an elongate object into a trench, the apparatus comprising:—
trench cutting means for cutting a trench;
moving means for moving the trench cutting means relative to the trench; and
lifting means comprising gripping means, for gripping and lifting the elongate object, and at least one lifting device for applying a lifting force to a lower surface of the elongate object at a plurality of locations spaced apart along the elongate object.

By providing at least one lifting device for applying a lifting force to a lower surface of the elongate object at a plurality of locations spaced apart along the elongate object, this provides the advantage of enabling a lifting force applied to the elongate object to be spread over a plurality of locations, thereby minimising the stress applied to the elongate object and reducing the risk of damage to the elongate object.

At least one said lifting device may be adapted to be moved between a stowed position and a working position.

At least one said lifting device may comprise a plurality of rollers.

At least one said lifting device may comprise at least one engaging portion pivotably mounted to a support and adapted to engage the elongate object at a plurality of locations spaced apart along the elongate object.

This provides the advantage of enabling the engaging portion to follow the path of the elongate object.

The gripping means and at least one said lifting device may be mounted to a common support.

According to a further aspect of the disclosure, there is provided a method of operating an apparatus for inserting an elongate object into a trench, the method comprising:—
cutting a trench using trench cutting means;
moving the trench cutting means relative to the trench; and
applying a lifting force to a lower surface of the elongate object at a plurality of locations spaced apart along the elongate object.

BRIEF DESCRIPTION OF THE DRAWINGS

Preferred embodiments will now be described, by way of example only and not in any limitative sense, with reference to the accompanying drawings, in which:

FIGS. 9A to 9F show the operation of a cable grab arm of FIG. 7.

DETAILED DESCRIPTION OF THE PREFERRED EMBODIMENT

Figure 1:
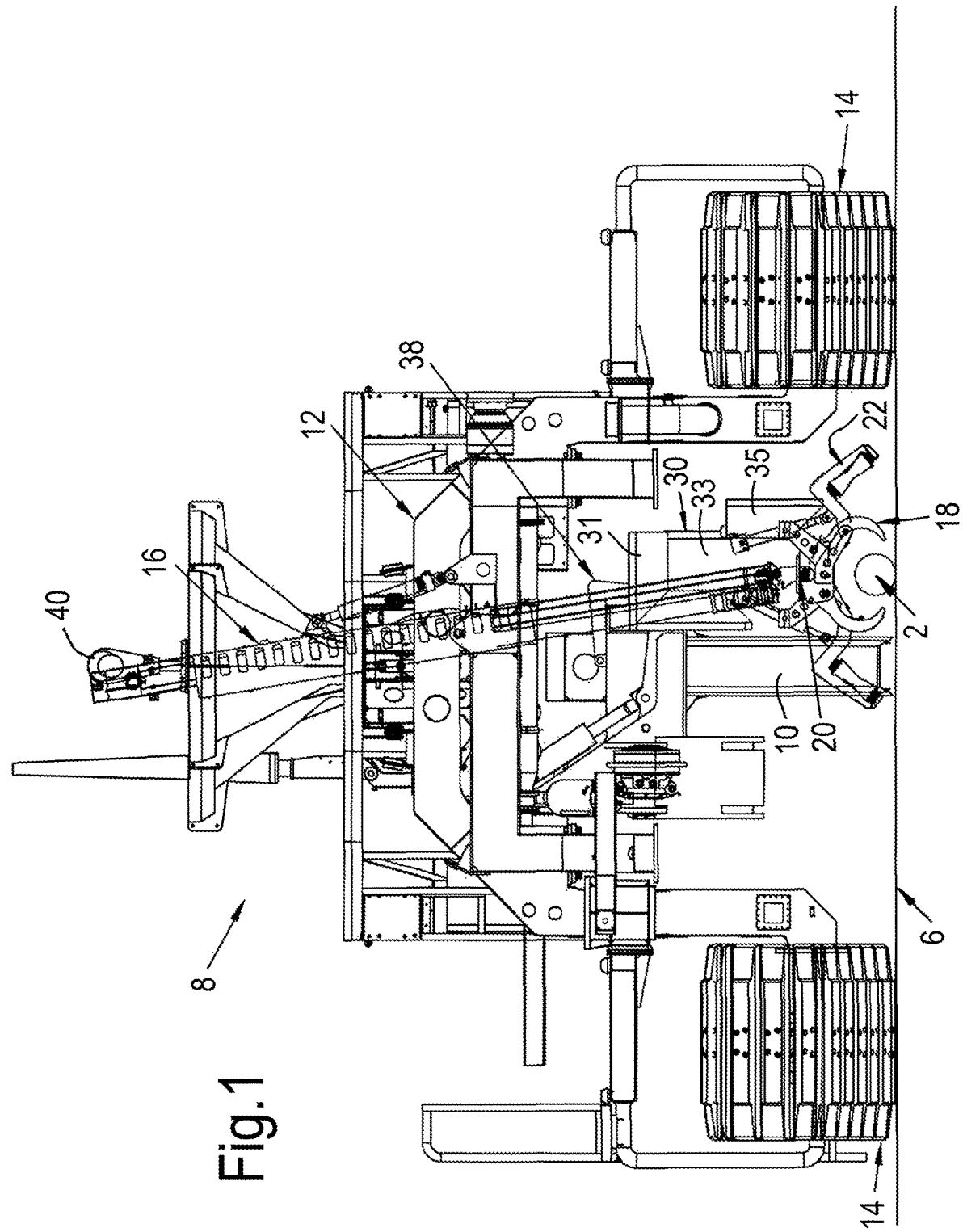
FIGS. 1 to 6 show a series of steps of loading a cable to be buried into a trench into a wheel cutter tractor of an embodiment.

Referring to FIG. 1, an apparatus embodying the present disclosure for inserting a cable 2 into a trench 4 (FIG. 5) in the seabed 6, the apparatus being in the form of a wheel cutter tractor 8, comprises trench cutting means in the form of a wheel cutter 10 for cutting the trench 4 in the seabed 6 for receiving the cable 2. The tractor 8 has a tractor body 12 which supports the wheel cutter 10 such that the vertical position of the wheel cutter 10 relative to the tractor body 12 is adjustable, and moving means in the form of tracks 14 for enabling movement of the tractor 8 relative to the seabed 6, so that the wheel cutter 10 can move relative to the trench 4 in a direction of travel of the tractor 8 to extend the length of the trench 4.

Figure 7:
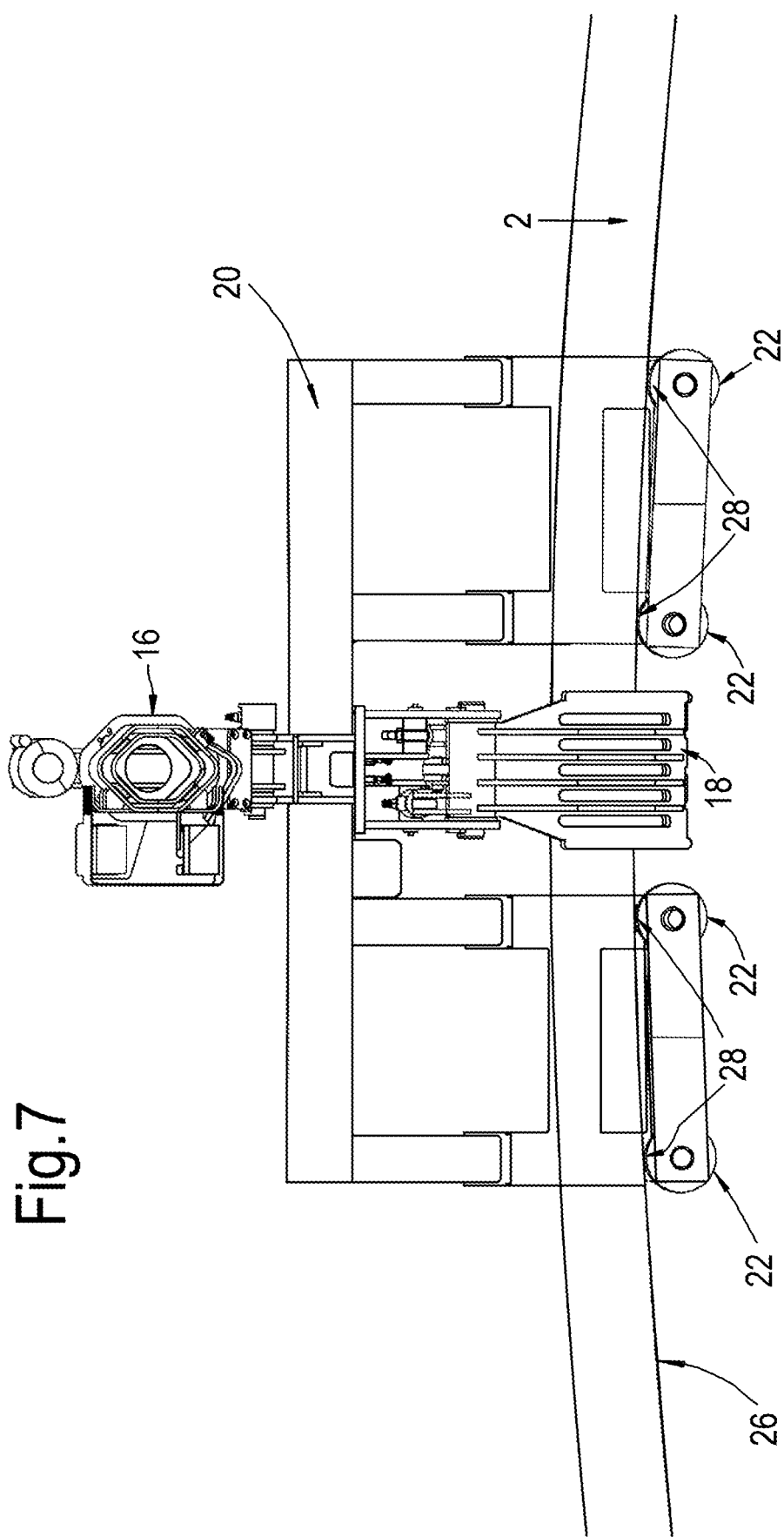
FIG. 7 shows a side view of the cable grab arm of the tractor of FIGS. 1 to 6 supporting a cable.

The tractor 8 also comprises lifting means in the form of a cable grab arm 16 supporting gripping means in the form of a cable grab 18 for gripping and lifting the cable 2 from the seabed 6, and a lifting device 20 comprising rollers 22 for applying a lifting force to a lower surface 26 of the cable 2 at a plurality of locations 28 (FIG. 7) separated along the length of the cable 2. The rollers 22 of the lifting device 20 are arranged in pairs on the cable grab arm 16, such that each pair of rollers 22 is pivotably mounted to the cable grab arm 16 so that the rollers 22 follow the path of the cable 2 on engagement with the lower surface 26 of the cable 2.

Figure 8:
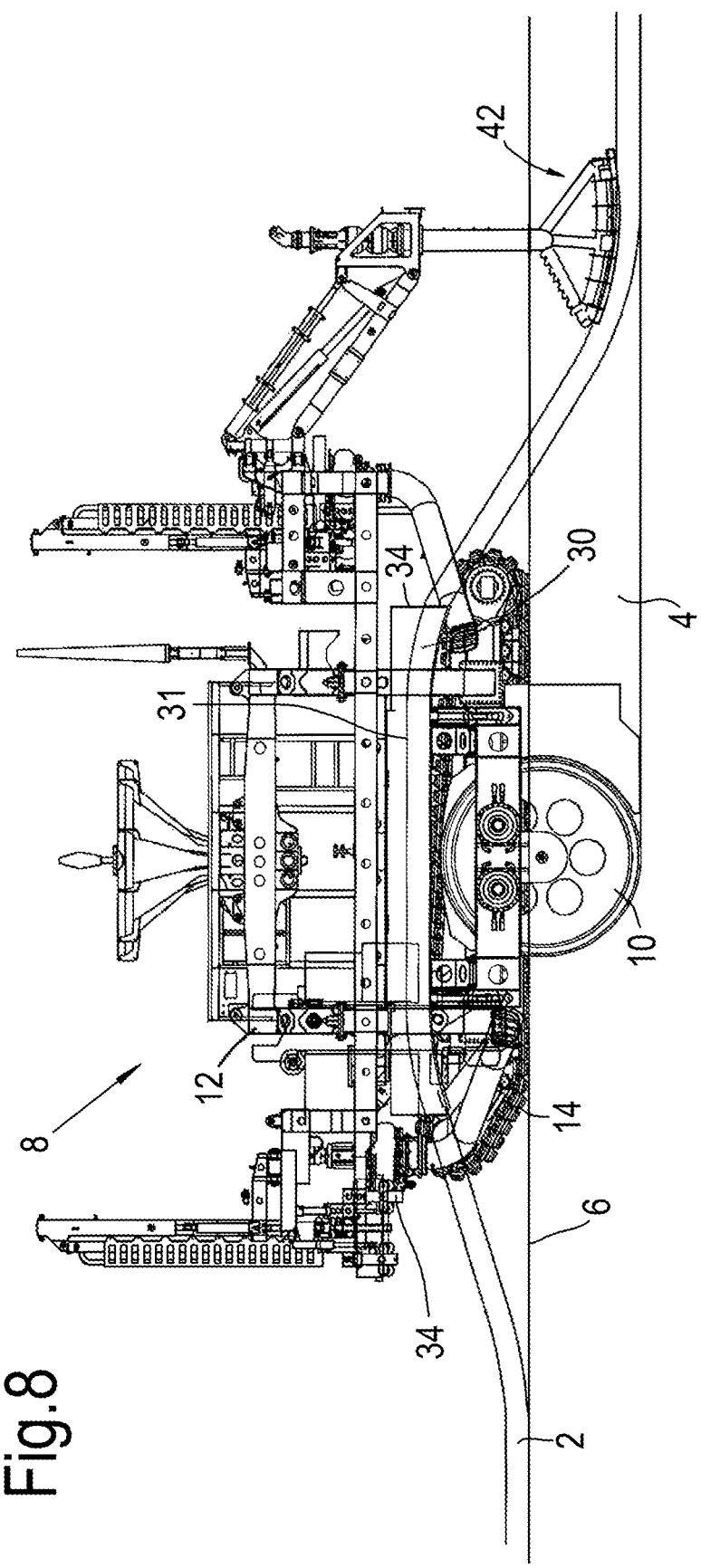
FIG. 8 shows a side view of the apparatus of FIG. 6.

The tractor 8 also comprises support means in the form of a cable support tray 30 mounted to the tractor body 12 for supporting the cable 2 at a first position 32 (FIG. 4) laterally of the tractor body 12, and transfer means in the form of the cable grab 18 for transferring the cable 2 into the cable support tray 30. The cable support tray 30 has a body 31 defining a channel 33 and retaining means in the form of a closable gate 35 for retaining the cable 2 in the channel 33. The gate 35 is shown in its open position in FIGS. 1 and 2 and in its closed position in FIGS. 3 to 6. The cable support tray 30 is also provided with bend limiting means in the form of a bellmouth 34 at its front and rear ends (FIG. 8) for preventing bending of the cable 2 around a bend of less than a predetermined bend radius.

Figure 4:
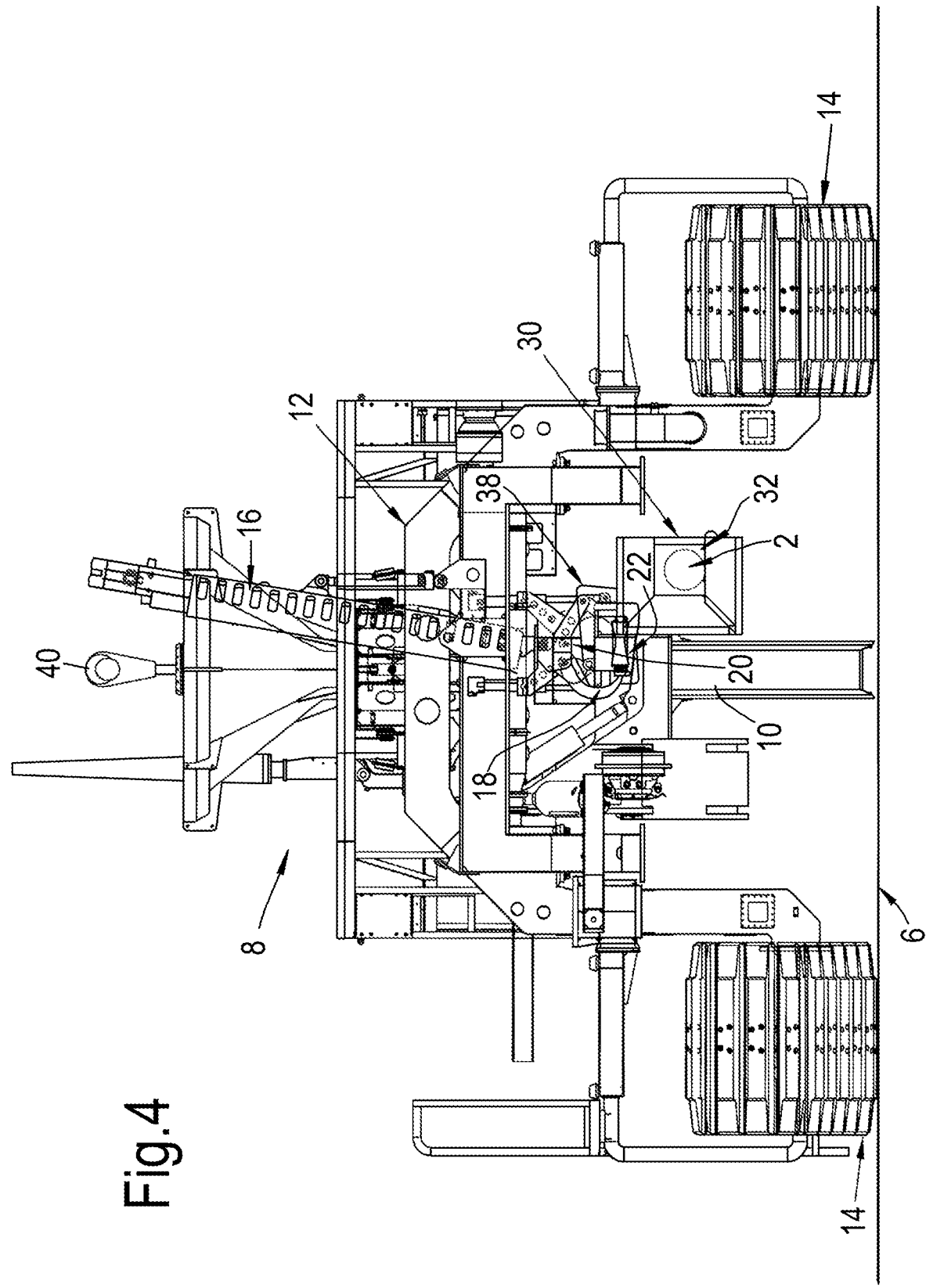

The cable support tray 30 is pivotably mounted to a support arm 38, to enable the cable support tray 30 to move the cable 2 from the first position 32 shown in FIG. 4 to a second position 36 (FIG. 6) above the wheel cutter 10.

The operation of the wheel cutter tractor 8 will now be described.

Referring to FIG. 1, the wheel cutter tractor 8 is lowered from a surface vessel (not shown) by means of a suspension part 40 to a landing position on the seabed 6 such that the wheel cutter 10 is located laterally of the cable 2 in a direction of travel of the tractor 8. As shown in more detail in FIGS. 9A to 9F, the cable grab arm 16 is initially in a retracted position (FIG. 9A) with the cable grab 18 closed and the lifting device 20 folded underneath the cable grab 18.

Figure 2:
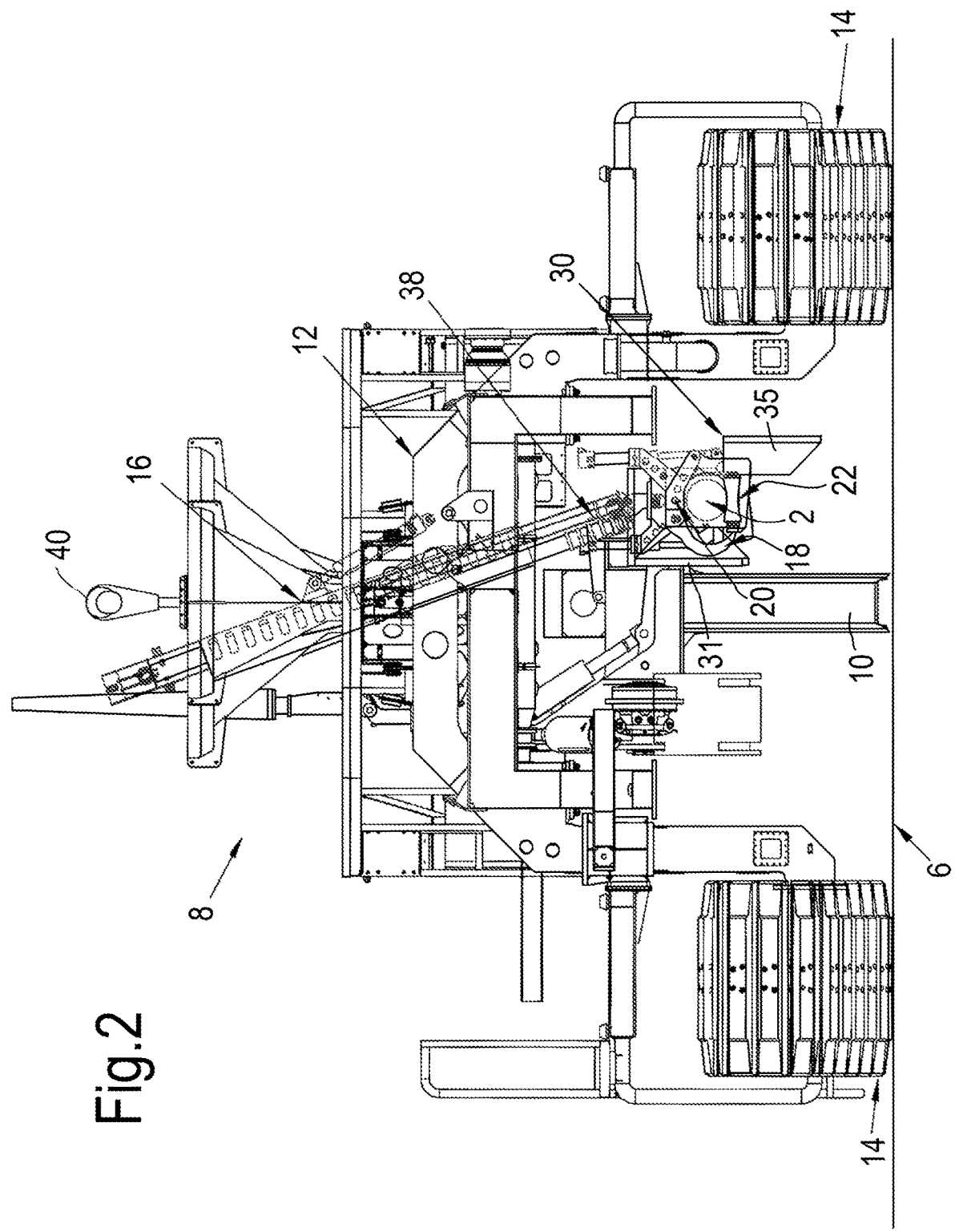
Figure 3:
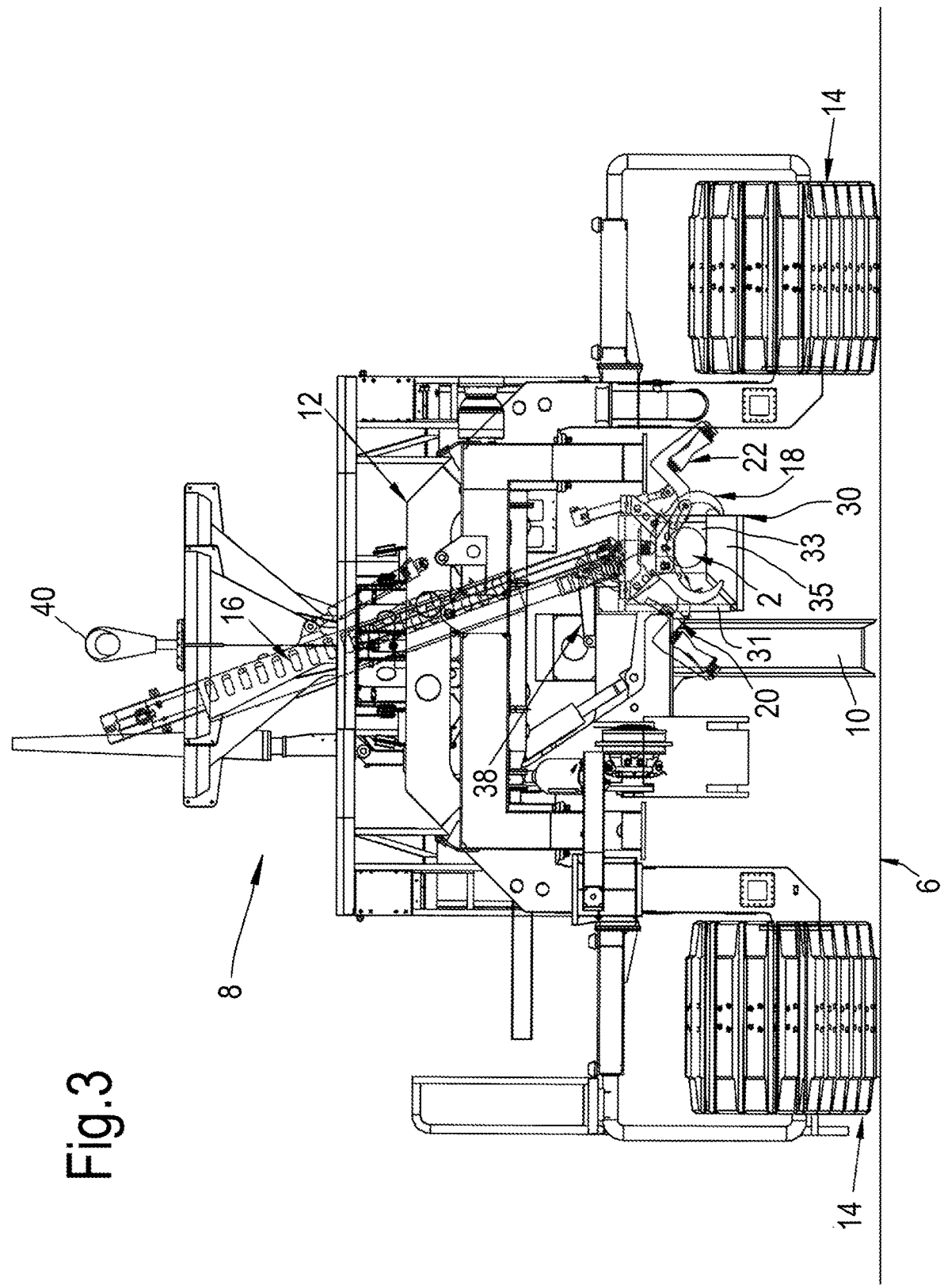

The cable grab 18 and lifting device 20 are then opened in preparation to receive the cable 2 (FIG. 9B) and the grab arm 16 is extended to move the grab 18 and lifting device 20 towards the cable 2. The grab arm 16 is then further extended, so that the open grab 18 and lifting device 20 are lowered into a position (FIG. 1; FIG. 9C) in which the grab 18 can grip the cable 2. The cable grab 18 is then closed (FIG. 9D) to grip the cable 2, and grab arm 16 retracted so that the cable 2 is then lifted a distance from the seabed 6 (FIG. 9E) sufficient to enable the rollers 22 of the lifting device 20 to be pivoted into position underneath the cable 2 (FIGS. 7, 9F) so that the rollers 22 of the lifting device 20 support the cable 2 at four locations 28 separated along the length of the cable 2 without the cable 2 being supported by the cable grab 18. The grab arm 16 is then further retracted to locate the cable 2 in the open channel 33 of the cable support tray 30 (FIG. 2). The gate 35 of the cable support tray 30 is then closed and the grab 18 and lifting device 20 opened, so that the cable 2 is only supported by the cable support tray 30. In this position, the cable support tray 30 prevents the cable 2 from coming into contact with the wheel cutter 10, thereby reducing the risk of damage to the cable 2.

Referring now to FIG. 4, the grab arm 16 is retracted to move the grab 18 and lifting device 20 into their stowed positions, and with the cable 2 supported on the cable support tray 30, the wheel cutter 10 is moved downwards to begin cutting the trench 4 in the seabed 6. When sufficient depth of trench 4 is achieved, i.e. the trench 4 is cut to its full depth, the cable 2 can be fed into the trench 4 rearwardly of the tractor 8 directly from the first position 32 by means of the rear bellmouth 34 and urging means in the form of a rear manipulator 42 (FIG. 8), if further stress on the cable 2 due to further lifting of the cable 2 is to be avoided.

Figure 5:
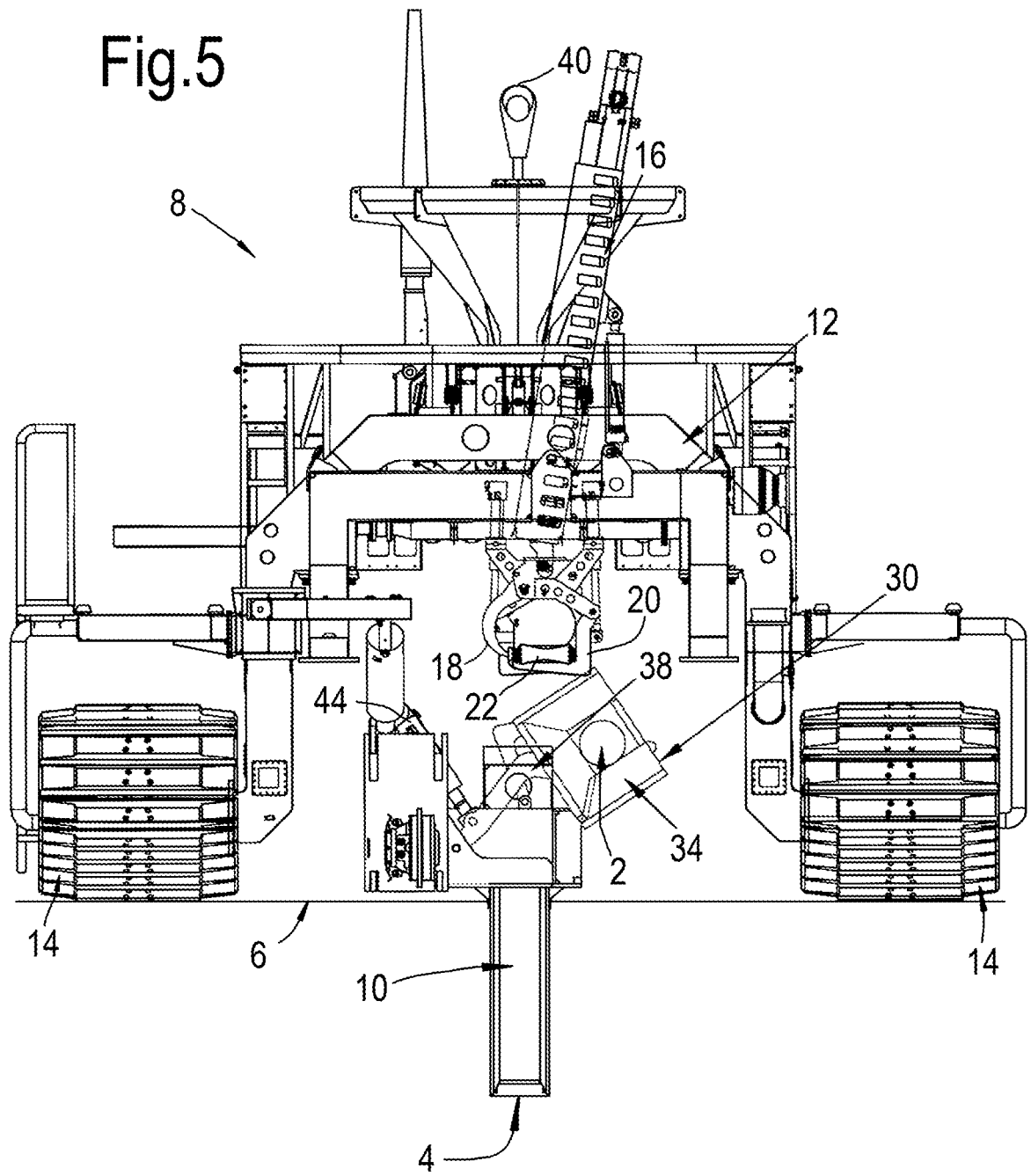
Figure 6:
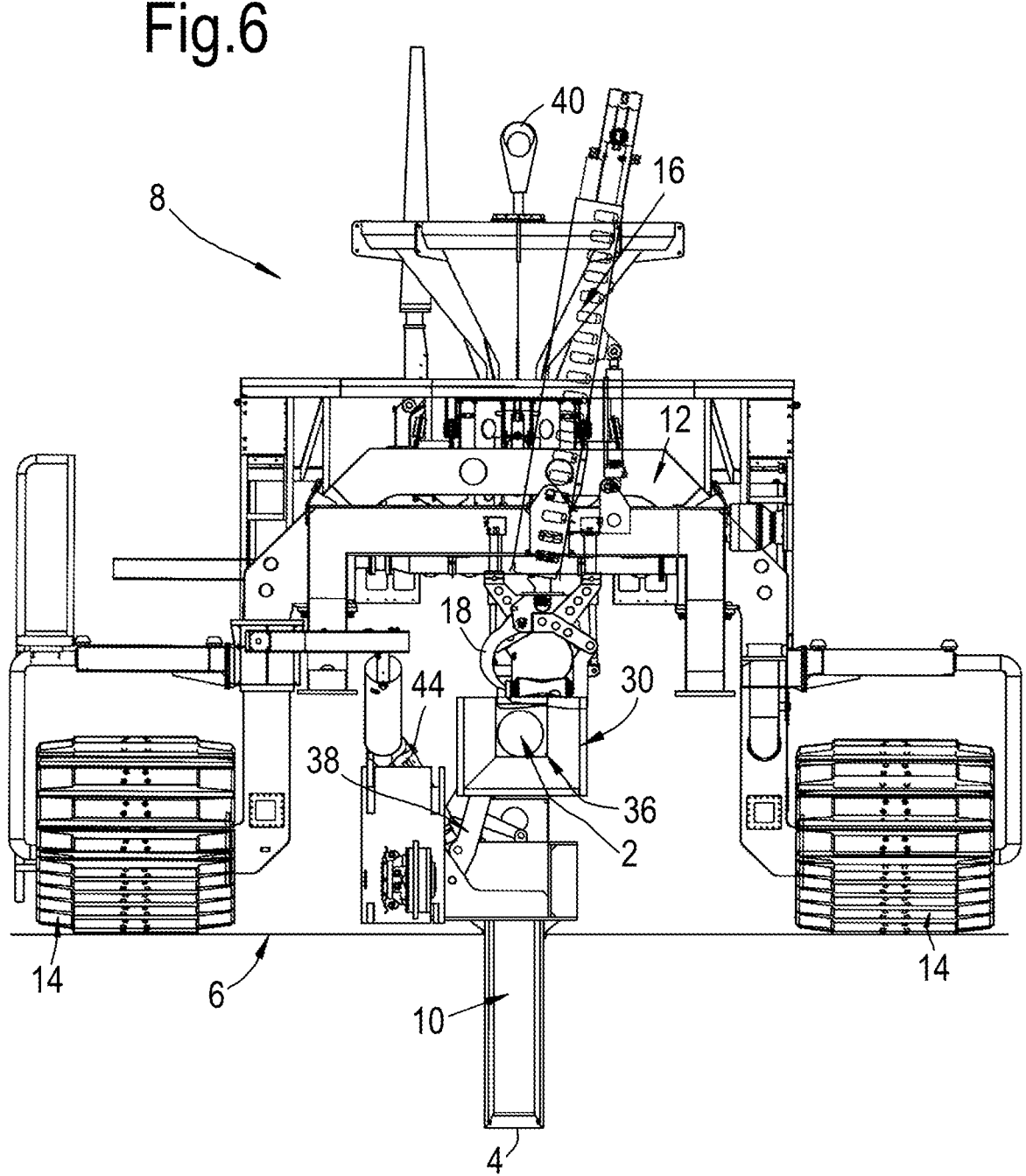

Alternatively, as shown in FIG. 5, the cable support tray 30 is slid and rotated by means of actuator 44 connected to support arm 38 into a second position, in which the cable 2 is supported by the cable tray 30 above the wheel cutter 10 (FIG. 6). The wheel cutter tractor 8 can then continue to form the trench 4 as it moves forwards relative to the seabed 6, and the cable 2 rearward of the tractor 8 either naturally falls into the trench 4, or is pushed into the trench 4 by the rear manipulator 42.

When sufficient length of trench 4 is achieved, the steps of FIGS. 4 to 6 are reversed and the gate 35 of cable support tray 30 is then opened to eject the cable 2 into the trench 4.

Given the benefit of this disclosure, it will be appreciated by persons skilled in the art that the above embodiments have been described by way of example only and not in any limitative sense, and that various alterations and modifications are possible without departure from the scope of the disclosure as defined in the appended claims.

The invention claimed is:

1. An apparatus for inserting an elongate object into a trench, the apparatus comprising:
a body defining a leading portion and a trailing portion;
a trench cutting device supported by the body for cutting a trench on a seabed;
a moving device supported by the body for moving the trench cutting device relative to the trench on the seabed;
a support device coupled to the body via a first structure at a first location within the leading portion for supporting at least part of an elongate object in at least one first position displaced from the trench cutting device in a direction transverse to a direction of travel of the apparatus, and in at least one second position above the trench cutting device; and
a transfer device coupled to the body via a second structure distinct from the first structure at a second location within the leading portion that is discrete from the first location for transferring at least part of the elongate object into the support device, wherein the transfer device includes a gripping device configured to grip the elongate object and a lifting device configured to engage a lower surface of the elongate object; and
wherein the lifting device further comprises a first support proximate the leading portion and positioned adjacent to the gripping device on a leading side of the gripping device and a second support proximate the leading portion and positioned adjacent to the gripping device on a trailing side of the gripping device, such that the lower surface of the elongate object is engaged by both the first support and the second support.

2. The apparatus according to claim 1, wherein the transfer device is adapted to transfer at least part of the elongate object into at least one said first position of the support device.

3. The apparatus according to claim 2, wherein the transfer device is adapted to lift at least part of the elongate object into at least one said first position of the support device.

4. The apparatus according to claim 1, further comprising a retaining device for retaining at least part of the elongate object in the support device.

5. The apparatus according to claim 4, wherein the retaining device is pivotable between a retaining position and a releasing position.

6. The apparatus according to claim 1, wherein the apparatus is adapted to insert at least part of the elongate object into the trench from at least one said first position.

7. The apparatus according to claim 1, further comprising a bend limiting device for preventing bending of the elongate object around a bend of less than a predetermined bend radius.

8. The apparatus according to claim 1, wherein the transfer device is moveable between a working position and a stowed position.

9. The apparatus according to claim 1, wherein the support device is moveable between at least one said first position and at least one said second position.

10. The apparatus according to claim 1, further comprising an urging device for urging the elongate object into the trench behind the apparatus in the direction of travel of the apparatus.

11. A method of operating an apparatus defining a leading end and a trailing end for inserting an elongate object into a trench, the method comprising:
cutting a trench on a seabed using a trench cutting device;
moving the trench cutting device relative to the trench on the seabed;
transferring with a transfer device located proximate the leading end of the apparatus and having a gripping device and a lifting device at least part of an elongate object into a support device located proximate the leading end of the apparatus, wherein the lifting device further comprises a first support proximate the leading end and positioned adjacent to the gripping device on a leading side of the gripping device and a second support proximate the leading end and positioned adjacent to the gripping device on a trailing side of the gripping device, such that the at least part of the elongate object is engaged by both the first support and the second support;
supporting with the support device the at least part of the elongate object in at least one first position displaced from the trench cutting device in a direction transverse to a direction of travel of the apparatus during cutting of the trench; and
moving the support device transversely and independently from the transfer device to position the at least part of the elongate object to at least one second position above the trench cutting device.

12. The method according to claim 11, wherein moving the support device further comprises pivoting the support device between the at least one first position and the least one second position above the trench cutting device.

13. The method according to claim 11, further comprising urging the elongate object into the trench behind the apparatus in the direction of travel of the apparatus.

14. An apparatus for inserting an elongate object into a trench, the apparatus defining a leading end and a trailing end and comprising:
a trench cutting device for cutting a trench;
a moving device for moving the trench cutting device relative to the trench;
a first lifting device proximate the leading end comprising a gripping device and configured to move laterally relative to the trench cutting device to grip and lift the elongate object on a seabed and positioned lateral to the trench cutting device, and at least one second lifting device for applying a lifting force to a lower surface of the elongate object at a plurality of locations spaced apart along the elongate object; and a supporting device proximate the leading end configured to support the elongate object and to move laterally relative to the trench cutting device independently of the first lifting device; and wherein at least one said second lifting device further comprises a first support proximate the leading end and positioned adjacent to the gripping device on a leading side of the gripping device and a second support proximate the leading end and positioned adjacent to the gripping device on a trailing side of the gripping device, such that the lower surface of the elongate object is engaged by both the first support and the second support.

15. The apparatus according to claim 14, wherein at least one said second lifting device is adapted to be moved between a stowed position and a working position.

16. The apparatus according to claim 14, wherein at least one said second lifting device comprises a plurality of rollers.

17. The apparatus according to claim 14, wherein at least one said second lifting device comprises at least one engaging portion pivotably mounted to a support and adapted to engage the elongate object at a plurality of locations spaced apart along the elongate object.

18. The apparatus according to claim 14, wherein the gripping device and at least one said second lifting device are mounted to a common support.

19. A method of operating an apparatus defining a leading end and a trailing end and configured for inserting an elongate object into a trench, the method comprising:
cutting a trench using a trench cutting device;
moving the trench cutting device relative to the trench;
gripping and lifting with a first device located proximate the leading end the elongate object positioned lateral to the trench cutting device from a seabed;
applying a lifting force with a second device located proximate the leading end to a lower surface of the elongate object at a plurality of locations spaced apart along the elongate object, wherein the second device further comprises a first support proximate the leading end and positioned adjacent to the first device on a leading side of the first device and a second support proximate the leading end and positioned adjacent to the first device on a trailing side of the first device, such that the lower surface of the elongate object is engaged by both the first support and the second support;
transferring the elongate object with the first device and the second device to a third device located primate the leading end; and
moving the third device laterally relative to the first device and the second device to orient the elongate object above the trench cutting device.

20. An apparatus for inserting an elongate object into a trench, the apparatus having a leading end and a trailing end and comprising:
a trench cutting device for cutting a trench;
a moving device for moving the trench cutting device relative to the trench in a direction of travel;
a cable grab arm proximate the leading end supporting a cable grab and a lifting device; and
a cable support tray proximate the leading end;
wherein the cable grab arm is configured to extend and retract laterally relative to the direction of travel and independently of the cable support tray;
wherein the cable support tray is configured to move laterally relative to the direction of travel and independently of the cable grab arm;

wherein the cable grab is configured to selective grip an elongate object positioned lateral to the trench cutting device in the direction of travel at a first location whereat the elongate object is supported by a seabed and to move the elongate object to a second location whereat the elongate object is spaced from the seabed; and wherein the lifting device is configured to selectively engage a lower surface of the elongate object at multiple locations along the elongate object when the elongate object is at the second location, and wherein the lifting device further comprises a first support proximate the leading end and positioned adjacent to the cable grab on a leading side of the cable grab and a second support proximate the leading end and positioned adjacent to the cable grab on a trailing side of the cable grab, such that the lower surface of the elongate object is engaged by both the first support and the second support.

21. The apparatus according to claim 20, wherein the cable support tray is configured to move between a first position lateral to the trench cutting device and a second position aligned with the trench cutting device in the direction of travel.

22. The apparatus according to claim 21, wherein the cable grab arm is configured to move the elongate object from the second location to the cable support tray when the cable support tray is in the first position.

23. A method of operating an apparatus defining a leading end and a trailing end for inserting an elongate object into a trench, the method comprising:
cutting a trench on a seabed using a trench cutting device;
moving the trench cutting device relative to the trench on the seabed;
extending a cable grab arm located proximate the leading end, which supports a cable grab and a lifting device, laterally relative to a direction of travel of the trench cutting device;
gripping an elongate object with the cable grab;
retracting the cable grab arm to lift the elongate object with the cable grab; and
supporting underneath the elongate object with the lifting device, wherein the lifting device further comprises a first support proximate the leading end and positioned adjacent to the cable grab on a leading side of the cable grab and a second support proximate the leading end and positioned adjacent to the cable grab on a trailing side of the cable grab, such that underneath the elongate object is engaged by both the first support and the second support;
moving the cable grab arm to position the elongate object into a cable tray located proximate the leading end and lateral to the trench cutting device in the direction of travel, wherein the cable grab arm moves laterally independently of the cable tray;
releasing the elongate object from the cable grab and the lifting device to locate the elongate object into the cable tray; and
moving the cable tray independently of the cable grab arm from lateral to the trench cutting device to aligned with the trench cutting device in the direction of travel.

24. The method according to claim 23, wherein:
moving the cable tray independently of the cable grab arm from lateral to the trench cutting device to aligned with the trench cutting device in the direction of travel comprises pivoting the cable tray about an axis aligned with the direction of travel.

* * * * *